United States Patent
Laur et al.

(10) Patent No.: US 9,493,118 B1
(45) Date of Patent: Nov. 15, 2016

(54) COGNITIVE DRIVER ASSIST WITH VARIABLE WARNING FOR AUTOMATED VEHICLES

(71) Applicant: DELPHI TECHNOLOGIES, INC., Troy, MI (US)

(72) Inventors: Michael H. Laur, Mission Viejo, CA (US); Serge Lambermont, Maastricht (NL); John P. Absmeier, Capitola, CA (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 14/748,522

(22) Filed: Jun. 24, 2015

(51) Int. Cl.
*G08G 1/00* (2006.01)
*G08G 1/123* (2006.01)
*B60Q 1/00* (2006.01)
*B60Q 9/00* (2006.01)

(52) U.S. Cl.
CPC ..................... *B60Q 9/008* (2013.01)

(58) Field of Classification Search
CPC .......... G08G 1/096716; G08G 1/205; G08G 1/0969; G08B 21/20; B60Q 1/525; G01S 13/931; G01S 19/42
USPC .......... 340/901, 605, 988, 995, 436; 701/41, 701/301, 213, 469
See application file for complete search history.

(56) References Cited

U.S. PATENT DOCUMENTS

| | | | | |
|---|---|---|---|---|
| 8,184,018 B2* | 5/2012 | Chen | ..................... | G01S 13/931 340/435 |
| 8,599,027 B2* | 12/2013 | Sanchez | ................. | A61B 3/113 340/435 |
| 8,862,384 B2 | 10/2014 | Stahlin et al. | | |
| 8,874,301 B1* | 10/2014 | Rao | ..................... | B60K 28/066 180/272 |
| 2008/0012697 A1* | 1/2008 | Smith | ..................... | B60K 35/00 340/438 |
| 2008/0189012 A1* | 8/2008 | Kaufmann | ........... | B62D 15/029 701/41 |
| 2009/0091435 A1* | 4/2009 | Bolourchi | ............ | B60K 28/066 340/435 |
| 2010/0007479 A1* | 1/2010 | Smith | ................... | B60W 50/14 340/436 |
| 2013/0093582 A1* | 4/2013 | Walsh | ................... | G08G 1/167 340/436 |
| 2014/0303827 A1 | 10/2014 | Dolgov et al. | | |

* cited by examiner

*Primary Examiner* — George Bugg
*Assistant Examiner* — Munear Akki
(74) *Attorney, Agent, or Firm* — Lawrence D. Hazelton (57) ABSTRACT

A cognitive-driver-assist system includes an object-detection device, an operator-detection device, and a controller. The object-detection device is operable to detect when an object is proximate to a host-vehicle. The operator-detection device is operable to determine when an operator of the host-vehicle is aware of the object. The controller is configured to output a warning-signal for the operator of the host-vehicle when the object-detection device detects the object. The warning-signal is characterized by a warning-intensity that is variable. The controller is configured to increase the warning-intensity when the operator is not aware of the object.

5 Claims, 6 Drawing Sheets

COGNITIVE DRIVER ASSIST WITH VARIABLE WARNING FOR AUTOMATED VEHICLES

TECHNICAL FIELD OF INVENTION

This disclosure generally relates to a cognitive-driver-assist system, and more particularly relates to a system that outputs a warning with increased intensity when the operator of a vehicle is not aware of an object proximate to the vehicle.

BACKGROUND OF INVENTION

It is known to equip vehicles with systems that warn an operator of an object proximate to a host-vehicle driven by the operator, or take control of the host-vehicle from the operator to avoid colliding with an object proximate to the host-vehicle. However, in some instances the warning or taking of control may be unnecessary and/or annoying if the operator is alert and fully aware of the presence/location of the object.

SUMMARY OF THE INVENTION

Described herein is a cognitive-driver-assist system that varies the warning-intensity of a warning or varies the degree to which the system takes over control of a host-vehicle driven by an operator. The warning-intensity and the take-over authority are determined in accordance with a measure of how aware the operator is of a particular object proximate to or in the travel-path of the host-vehicle. For example, if the operator appears to be tired or distracted, the warning-intensity of a warning may be increased to wake-up the operator, and/or the amount of operator-authority allowed to the operator for manually operating the host-vehicle may be limited so that automated controls provided for automated vehicle operation may override the manual-controls operated by the operator and temporarily take control of the host-vehicle. It is noted that automated operation of the host-vehicle includes a wide range of options from partial automation where, for example, only speed-control is automated to full automation (i.e. autonomous operation) where the operator of the host-vehicle is little more involved with the operation of the host-vehicle than is a passenger.

In accordance with one embodiment, a cognitive-driver-assist system is provided. The system includes an object-detection device, an operator-detection device, and a controller. The object-detection device is operable to detect when an object is proximate to a host-vehicle. The operator-detection device is operable to determine when an operator of the host-vehicle is aware of the object. The controller is configured to output a warning-signal for the operator of the host-vehicle when the object-detection device detects the object. The warning-signal is characterized by a warning-intensity that is variable. The controller is configured to increase the warning-intensity when the operator is not aware of the object.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
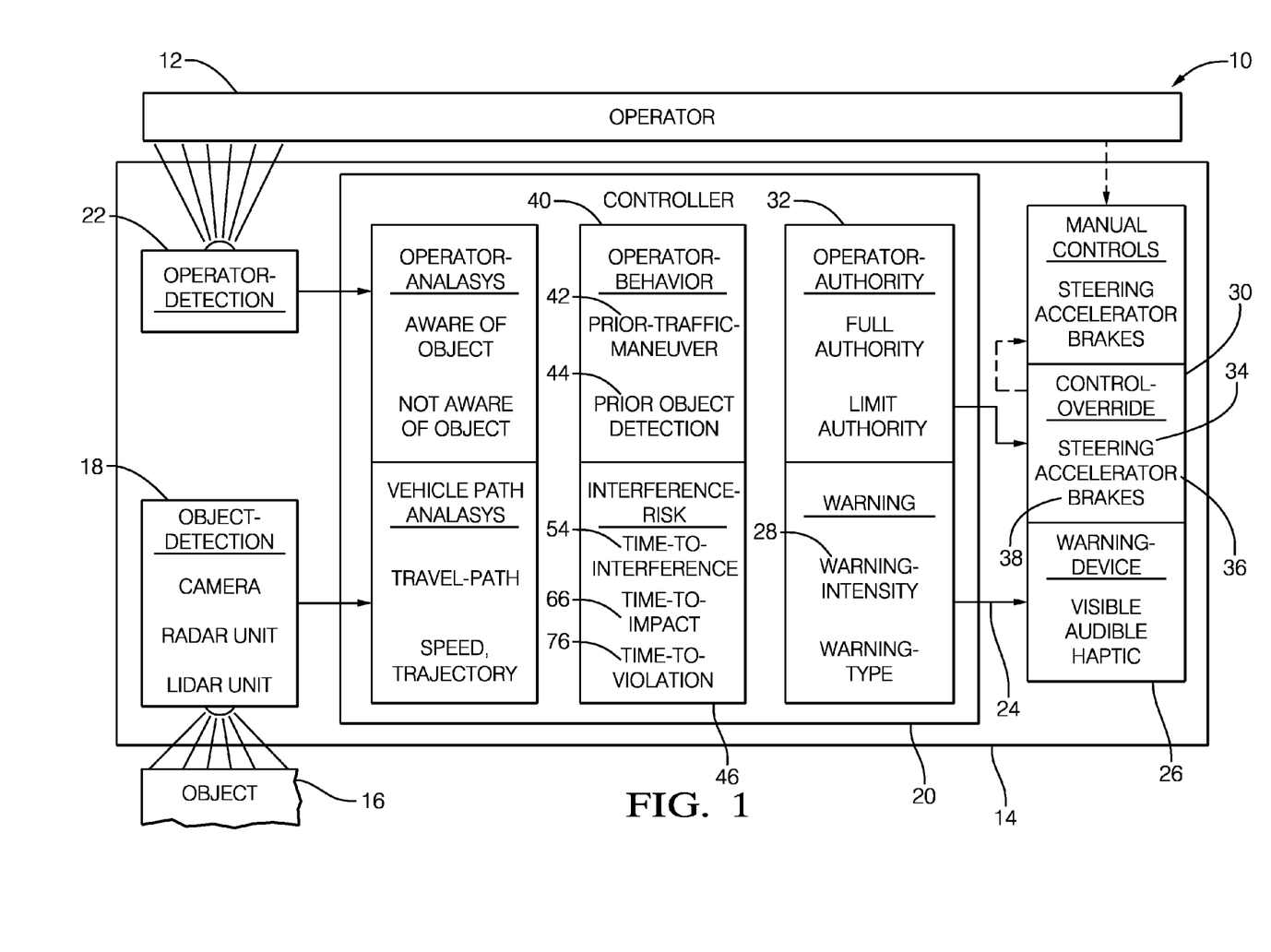
FIG. 1 is a diagram of a cognitive-driver-assist system in accordance with one embodiment.

FIG. 1 illustrates a non-limiting example of a cognitive-driver-assist system 10, hereafter referred to as the system 10. In general, the system 10 is configured to assist an operator 12 with manual-operation of a host-vehicle 14 based on a cognitive state of the operator 12 with regard to an object 16 proximate to the host-vehicle 14. As will be described in more detail below, the level of assistance provided to the operator 12 by the system 10 may vary from something as simple as illuminating a warning-indicator when an object 16 such as another vehicle is present in the so-called blind-spot of the operator 12, to something as complex as taking complete control of the host-vehicle 14, i.e. completely overriding the operator 12, to avoid a collision with the object 16. The system 10 described herein as an advantage over prior driver assist systems in that the system 10 takes the cognitive state of the operator 12 into consideration so the level of assistance necessary to assist the operator 12 can be determined. For example, the loudness of an audible warning indicator may be increased if the operator 12 is not aware of the particular object to which the warning is related.

Accordingly, the system 10 includes an object-detection device 18 operable or useful to detect when the object 16 is proximate to the host-vehicle 14. The object-detection device 18 may include, but is not limited to a video camera, a radar unit, and/or a LIDAR unit suitably configured to detect various objects about the host-vehicle 14. By way of further example and not limitation, a camera may be used to capture images of objects such as other-vehicles, buildings, roadway signs, pedestrians, lane-markings, roadway hazards, construction area markers, and other objects located proximate to or about the host-vehicle 14.

Information from the camera may be combined with detection information from the radar unit and/or the LIDAR unit to form a two-dimensional or three-dimensional map of various objects in the area surrounding the host-vehicle 14. Information gathered by the operation of the object-detection device 18 may be provided to a controller 20 for further analysis. That is, the object-detection device 18 may not by itself actually determine the location of or classification of the object 16. Typically that task falls to the controller 20, but this is not a requirement of the system 10. In other words, either the object-detection device 18 or the controller 20 may perform the data or signal processing necessary to determine a relative location or classification of the object 16.

The object-detection device 18 may also include a vehicle-to-vehicle (V2V) transceiver. If the object 16 is another-vehicle that is also equipped with a V2V transceiver, then the system 10 may be able to notify the operator 12 that the other-vehicle is approaching even if the operator 12 cannot see the other-vehicle because the line of sight between the two is obstructed.

The system 10 may be configured to classify the object 16 based on signals received from the object-detection device 18. For example, if the object 16 is a pedestrian walking perpendicular to the direction of travel of the host-vehicle 14, signals from the LIDAR unit or the radar unit may have a unique signature caused by the alternating motion of the legs of the pedestrian. Similarly, radar returns reflected from a moving vehicle may include micro-fluctuations cause by the rotational motion of the wheels of the moving vehicle. This information may optionally be combined with other known image processing techniques to classify the object as, for example, a pedestrian, another-vehicle, a construction-zone marker, an animal, a roadway barrier, etc. Information about motion of the object 16 may also be used to classify the object 16 and assign motion related parameters such as speed, trajectory, acceleration/deceleration, and the like to the object 16. As such, the object-detection device 18 is operable to detect when the object 16 is proximate to, i.e. close-by, in the travel-path, or approaching the travel pate of the host-vehicle 14.

The controller 20 may include a processor (not specifically shown) such as a microprocessor or other control circuitry such as analog and/or digital control circuitry including an application specific integrated circuit (ASIC) for processing data as should be evident to those in the art. The controller 20 may include memory (not specifically shown) including non-volatile memory, such as electrically erasable programmable read-only memory (EEPROM) for storing one or more routines, thresholds and captured data. The one or more routines may be executed by the processor to perform steps for processing signals received by the controller 20 for operating the host-vehicle 14 as described herein.

The system 10 also includes an operator-detection device 22 that is operable or useful to determine when the operator 12 of the host-vehicle 14 is aware of the object 16. The operator-detection device 22 may include a camera configured to capture images of the operator 12 in the visible light spectrum and/or the infrared light spectrum, and a light source that emits light in a suitable portion of the light spectrum so the camera can see the operator 12 regardless of ambient lighting conditions. The images of the operator 12 may be processed/analyzed by the operator-detection device 22 or the controller 20 to, for example, determine if the eyes of the operator 12 are closed indicating that the operator 12 is sleeping, determine if the head-pose of the operator varies in a manner that indicates that the operator 12 is tired, and/or determine if the eye-gaze direction of the operator 12 indicates that the operator 12 has or has not seen the object 16. Image processing techniques to determine a cognitive state of the operator 12 such as where the operator is looking (eye-gaze direction) and/or if the operator 12 is alert (eye-blinking, head-pose variation) are well-known.

If the eye-gaze direction of the operator 12 is observed or determined via the operator-detection device 22 to not be in a direction that would allow the operator 12 to see the object 16 directly, via a mirror, or via peripheral vision, then that may be an indication that the operator 12 is not aware of the object 16. If the system 10 determines that the operator 12 is not aware of the object 16, and the relative location of the object 16 relative to the host-vehicle 14 is such that a collision or interference is possible, then the system 10 may take various actions to assist the operator 12 to avoid the collision or interference with the object 16. As used herein, interference with the object 16 means that the trajectories of the host-vehicle 14 and the object 16 are such that if no change is made by either, then a collision is likely. By way of example and not limitation, an example of interference occurs when the object 16 is another vehicle traveling in a lane beside the host-vehicle 14 and in the blind spot of the operator 12, and the operator 12 operates the host-vehicle 14 in a manner that causes the other vehicle to swerve to avoid a collision. That is, no collision occurred, but a collision was avoided as the result of action by the other vehicle to avoid colliding with the host-vehicle 14.

In one embodiment of the system 10, the controller 20 may be configured to output a warning-signal 24 for the operator 12 of the host-vehicle 14 when the object-detection device 18 detects the object 16. The warning-signal 24 is provided to a warning-device 26 that may include, for example, a visible warning device such as an illuminated indicator or a highlighted region of a reconfigurable display, an audible warning device such as a buzzer or speaker, and/or a haptic warning device such as a vibrating device located in a seat or steering wheel of the host-vehicle 14.

In this embodiment, the warning-signal 24 characterized by a warning-intensity 28 that is variable. The intensity of a warning by the warning-device 26 may be increased by, for example, increasing the loudness of an audible warning, increasing the highlighting intensity or vigorous flashing of the visible warning, and/or simultaneously combining two or more of the warning types available from the warning-device 26. It is contemplated that the warning-intensity 28 may initially be set to zero or null such that no warning is given, i.e. no warning device is activated, and that increasing the warning-intensity 28 corresponds to changing from no warning being given to some sort of warning being given. That is, it is not a requirement that increasing the warning-intensity 28 necessarily means that the initial warning-intensity was not zero or null.

The system 10 described herein is an improvement over prior systems because the controller 20 is configured to increase the warning-intensity 28 when the operator 12 is not aware of the object 16. That is, rather than issuing a warning with the same intensity when the operator 12 is alert and aware of the object 16, and when the operator 12 is sleepy and not aware of the object 16, the system 10 varies the warning intensity 28 based on the cognitive state of awareness of the operator 12, in particular whether or not the operator 12 is aware of the presence of the object 16. Several specific traffic scenarios are described later in this document that will make the advantageousness of the system 10 described herein readily apparent.

In another embodiment, the system 10 includes a control-override device 30 operable to limit operator-authority 32 of the operator 12 while the operator 12 is driving the host-vehicle 14. As used herein, 'to limit operator-authority' means to limit the operator's ability to manually control some aspect of operation of the host-vehicle 14, i.e. to prevent or limit to some degree the ability of the operator 12 to have complete manual control of the host-vehicle 14. The controller 20 indicates that the operator-authority 32 is limited by setting of the operator-authority 32 to other than 'full authority'. The controller 20 completely or partially overrides manual control of the host-vehicle 14 by activating the control-override device 30. By way of example and not limitation, the control-override device 30 may include one or more of a steering-override device 34, an accelerator-override device 36, and a brake-override device 38.

By way of further example, the steering-override device 34 may be operated by the controller 20 to override hand-wheel input from the operator 12 to prevent the operator 12 from executing a lane change because the object-detection device 18 has detected an other-vehicle next to the host-vehicle 14 and a collision will result if the lane change is made. Similarly, the steering-override device 34 may be operated by the controller 20 to override the operator 12 holding the steering-wheel in a fixed position to swerve the host-vehicle 14 in order to avoid some debris in the travel-lane of the host-vehicle 14.

In one non-limiting configuration the steering-override device 34 may apply a force to the steering system of the host-vehicle 14 that physically over-powers any attempt by the operator 12 to influence the steering of the host-vehicle 14. This configuration may be preferable when there is an uninterruptable mechanical connection between the hand-wheel used by the operator 12 to steer the host-vehicle 14 and the steering wheels (e.g. front wheels) of the host-vehicle 14. In alternative configurations the steering system may include a steering-clutch operable to mechanically de-couple the hand-wheel from the front-wheels, or the steering system may be a steer-by-wire type system so the rotation of the hand-wheel by the operator 12 can be readily ignored.

As described in the examples above, and other examples given below, what the operator 12 indicates for desired operation of the host-vehicle 14 may be limited or ignored in favor of operating the host-vehicle 14 in accordance with the controller 20 when the operator 12 is not aware of the presence of the object 16 and a collision or interference is likely to occur. That is, the controller 20 may be configured to operate the control-override device 30 in accordance with the operator-authority 32 to override the operator 12 avoid interference with the object 16 when the operator 12 is not aware of the object 16.

FIG. 1 suggests that there are two levels of authority: full authority and limited authority. However, many levels of partial authority are contemplated, and the level designated would be based on regular observations of the operator by the operator-detection device 22. It is also contemplated that the actions of providing a warning to the operator 12 and overriding efforts by the operator 12 to manually control the host-vehicle 14 may be combined. For example, when the controller 20 determines that the operator 12 is not aware of the object 16, the controller 20 may first activate the warning-device 26 with the warning-intensity 28 at a relatively low level, and then increases the warning-intensity 28 to a higher level before the controller 20 determines to limit the operator-authority 32 by activating the control-override device 30.

The controller 20 may also be configured to determine an operator-behavior characteristic 40 of the operator 12 based on a prior-traffic-maneuver 42 executed by the operator 12. As used herein, the operator-behavior characteristic 40 is used to characterize driving habits or driving style of the operator 12. The operator-behavior characteristic 40 may include or be directed to, but not limited to, how fast the operator 12 drives relative to the posted speed limit, i.e. how many miles per hour above or below the posted speed limit that the operator 12 typically travels. Other examples include how quickly the operator 12 accelerates from a stop, how quickly the operator 12 decelerates to a stop when approaching an intersection, how often the operator 12 looks at the rear-view and side-view mirrors or otherwise scans the area about the host-vehicle 14, and how much time in advance of making a lane-change the operator 12 activates a turn-signal. The controller 20 may calculate a prior-object-detection score 44 based on the percentage of time that the operator 12 appears to have actually detected the presence of an object that is detected and/or being tracked by the system 10.

The controller 20 may also be configured to determine an interference-risk 46 indicative of the probability of interference between the host-vehicle 14 and the object 16. As used herein, the 'probability of interference' includes, but is not limited to, an estimate of the probability of an actual collision, and/or an estimate of the probability that some change in the observed behavior of operator 12, the host-vehicle 14, or some other-vehicle (an object) proximate to the host-vehicle 14 is necessary to avoid a collision. The controller 20 may determine the warning-intensity 28 and/or the operator-authority 32 based on the prior-traffic-maneuver 42 and an interference-risk 46. The examples of various traffic scenarios that follow are provided to further explain how the controller 20 described thus far operates to assist the operator 12 with the operation of the host-vehicle 14.

Figure 2:
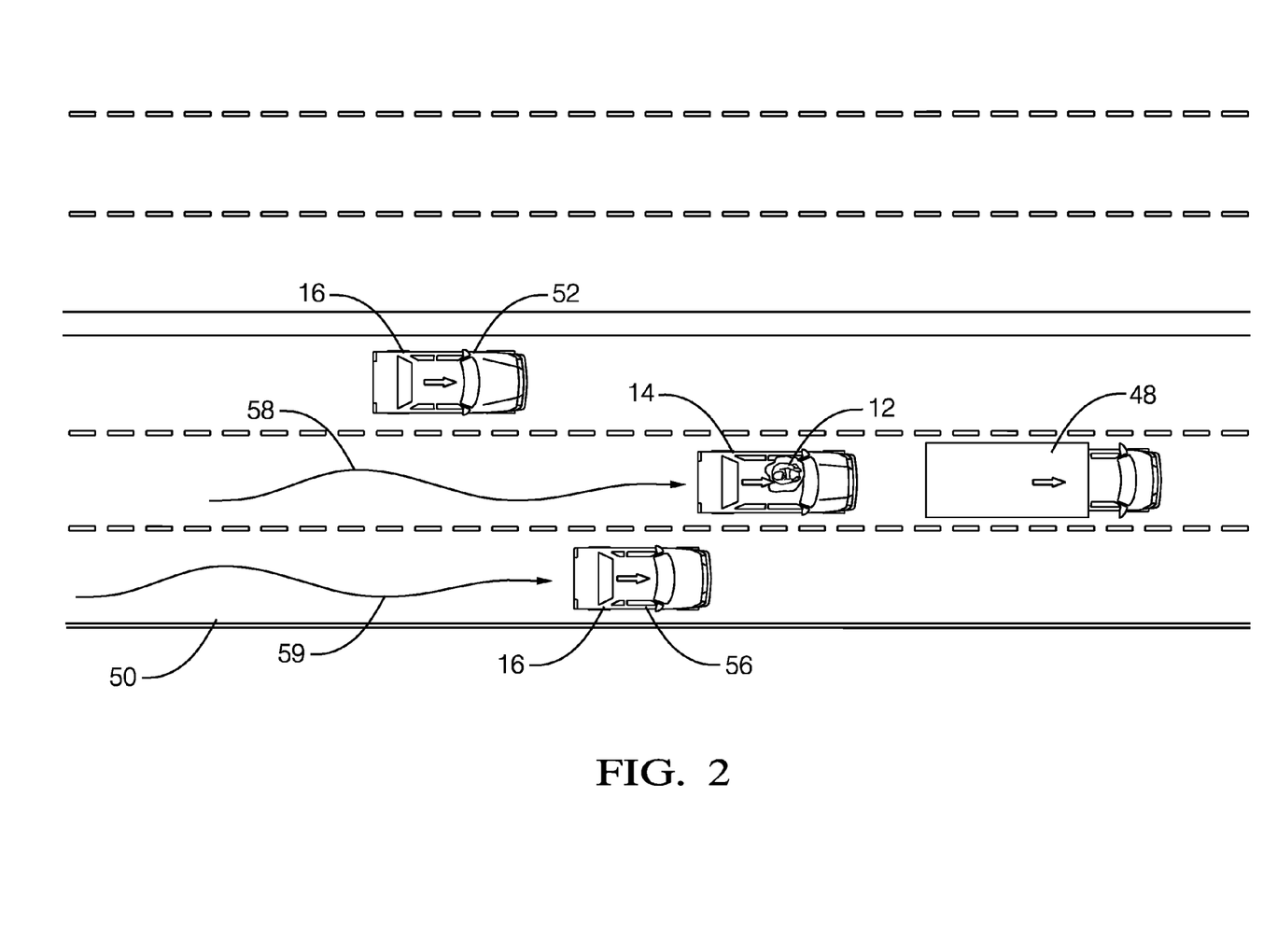
FIG. 2 is an example traffic scenario experienced by the system of FIG. 1 in accordance with one embodiment.

FIG. 2 illustrates a non-limiting example of the host-vehicle 14 approaching a truck 48 traveling a roadway 50 where the truck 48 is traveling slower than and in the same lane as the host-vehicle 14, so the host-vehicle 14 is likely to pass the truck 48. In this example the object 16 is an other-vehicle 52 traveling faster than the host-vehicle 14 and in the lane the host-vehicle 14 is likely to use to pass the truck 48. The operator-behavior characteristic 40 observed by the controller 20 may include an indication that the operator 12 tends to slow-down when approaching another vehicle forward of the host-vehicle 14 instead of maintaining a constant speed and making a lane-change in a timely manner. Also, when the operator 12 executes a lane-change, the controller 20 may be configured to measure the time it takes the operator 12 to complete the lane change. That is, the operator-behavior characteristic 40 may include a lane-change-interval (not shown) stored in the controller 20 and based on a prior-lane-change (prior-traffic-maneuver 42) executed by the operator 12.

Accordingly, the interference-risk 46 may include an estimate of a time-to-interference 54 for interference between the other-vehicle 52 with the host-vehicle 14. The controller 20 may be configured to determine the warning-intensity 28 based on a comparison of the lane-change-interval to the time-to-interference 54. For example, the loudness of a warning may increase as the time-to-interference 54 (FIG. 1) decreases while the operator 12 appears to be contemplating making a lane-change. Alternatively, or in combination with varying the warning-intensity 28, the controller 20 may limit the operator-authority 32 and prevent the operator 12 from making the lane change to pass the truck 48 when the other-vehicle 52 is approaching too fast to avoid substantial interference.

Continuing to refer to FIG. 2 for another example, the object 16 may be an other-vehicle 56 traveling in the so-called blind-spot of the operator 12 of the host-vehicle. The operator-behavior characteristic 40 may include a measure of a lane-position-variation 58 of the host-vehicle 14 when the host-vehicle 14 is steered by the operator 12. The controller 20 may also determine a similar characteristic for the other-vehicle 56 based on a prior-travel-path 59 of the other-vehicle 56. The interference-risk 46 may be determined by the controller 20 may include a determination of a probability-of-interference (not specifically shown) between the other-vehicle 56 and the host-vehicle 14 when the other-vehicle 56 is beside the host-vehicle 14. That is, the controller 20 may estimate the risk of a collision occurring because the host-vehicle 14 and/or the other vehicle 56 are weaving.

The controller 20 may issue a warning with a relatively low intensity blind-spot warning if the vehicles were not weaving and the operator 12 was aware of the other-vehicle 56. However, if the probability-of-interference is estimated to be greater than a risk threshold (not shown) stored in the controller 20, then the controller 20 may increase the warning-intensity 28 by making an audible alarm louder and/or displaying a message on a display to indicate that the operator 12 is weaving excessively while the other-vehicle 56 is proximate to the host-vehicle 14. Alternatively, or in combination with increasing the warning-intensity 28, the controller 20 may limit the operator-authority 32 and prevent the operator 12 from weaving by providing some steering damping to the steering system via the steering-override device 34 in an attempt to reduce the value of the lane-position-variation 58.

Figure 3:
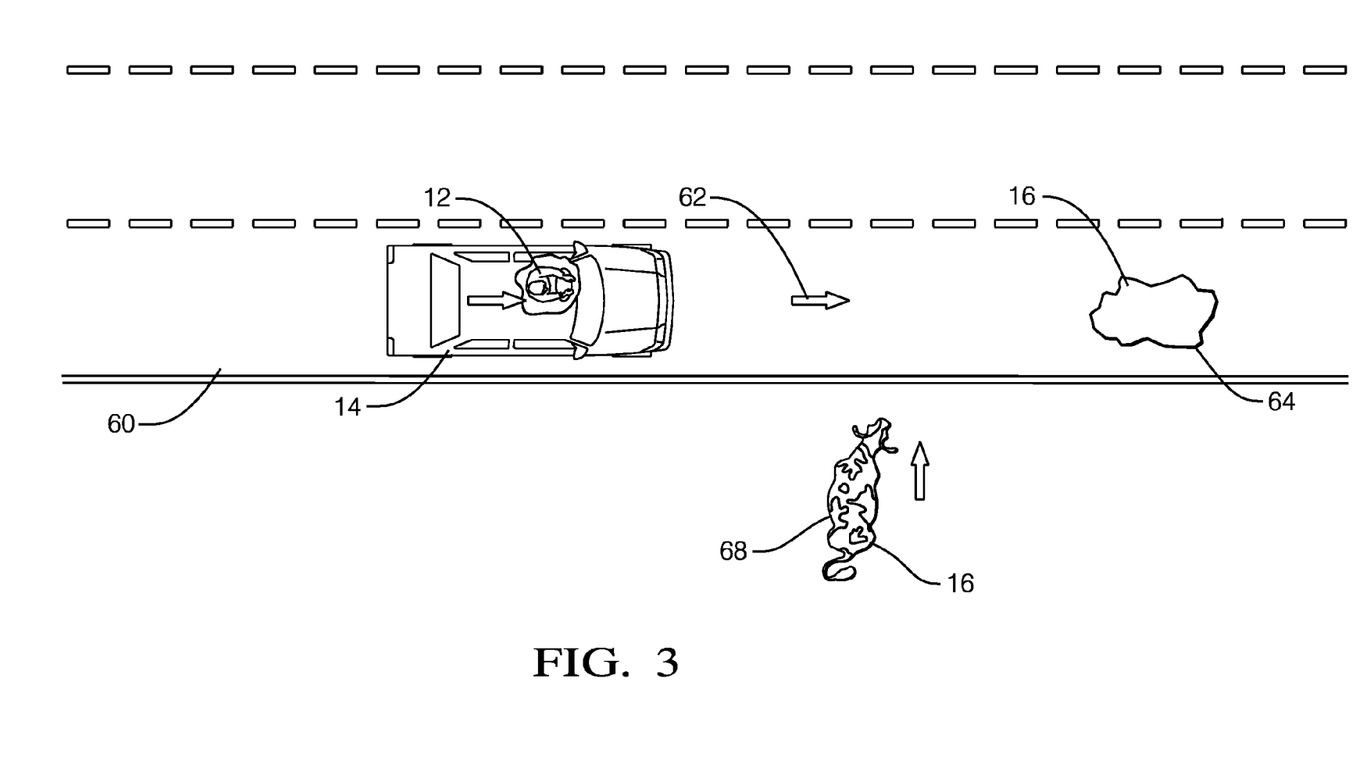
FIG. 3 is an example traffic scenario experienced by the system of FIG. 1 in accordance with one embodiment.

FIG. 3 illustrates another non-limiting example where the host-vehicle 14 is traveling the roadway 60 and the object 16 is stationary at a location in a travel-path 62 of the host-vehicle 14. For example, the object 16 may be debris 64 that fell from a truck (not shown) that previously traveled the roadway 60. The controller 20 may be further configured to estimate a time-to-impact 66 (FIG. 1) with the object 16 (the debris 64) by the host-vehicle 14. It is contemplated that the time-to-impact 66 is calculated based on an assumption that the host-vehicle proceeds along the travel-path 62 with no change in speed or trajectory.

If the time-to-impact is relatively long, greater than five seconds for example, the controller 20 may set the warning-intensity 28 relatively low and merely illuminate an indicator observable by the operator 12 of the host-vehicle 14. However, if the time-to-impact 66 is less than a time-threshold (not shown) stored in the controller 20, less than 2 seconds for example, and/or the gaze-direction of the operator 12 suggests that the operator is not aware of the debris 64, the controller 20 may increase the warning-intensity 28 by additionally activating an audible alarm and/or activing a haptic device to vibrate the seat of the operator 12. Alternatively, or in combination with increasing the warning-intensity 28, the controller 20 may limit the operator-authority 32, activate the steering-override device 34, and operate the steering-override device 34 to avoid the object 16 when the operator 12 is not aware of the object 16.

Continuing to refer to FIG. 3, the object 16 may be a pedestrian or animal 68 approaching the travel-path 62 of the host-vehicle 14. The controller 20 may be further configured to estimate the time-to-impact 66 with the pedestrian or animal 68 by the host-vehicle 14 based on the speeds and relative trajectories of the two. If the object is a pedestrian (e.g. a human), the camera of the object-detection device 18 may be used to determine a gaze direction of the pedestrian to determine if the pedestrian is aware of the host-vehicle 14. The controller 20 may increase the warning-intensity 28 when the time-to-impact 66 is less than a time-threshold (e.g. 2 seconds) and the operator 12 is not aware of the pedestrian or animal 68. Alternatively, or in combination with increasing the warning-intensity 28, the controller 20 may activate or operate the brake-override device 38 and/or the accelerator-override device 36 to stop the host-vehicle 14 when the operator 12 is not aware of the pedestrian or animal 68.

Figure 4:
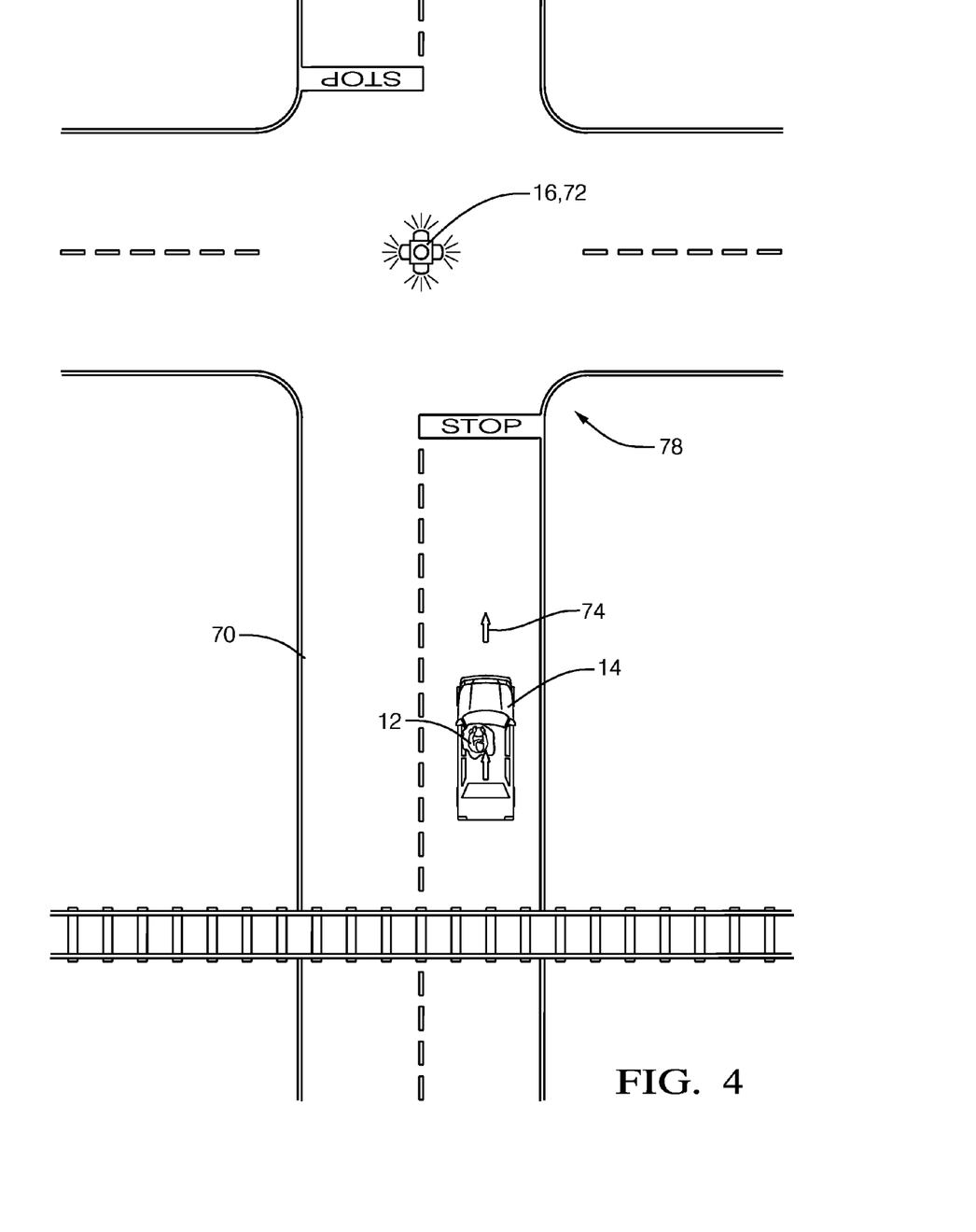
FIG. 4 is an example traffic scenario experienced by the system of FIG. 1 in accordance with one embodiment.

FIG. 4 illustrates another non-limiting example where the host-vehicle 14 is traveling the roadway 70 and the object 16 is a traffic-signal 72 for the travel-path 74 of the host-vehicle 14. The controller 20 (FIG. 1) may be further configured to estimate a time-to-violation 76 (FIG. 1) of the traffic-signal 72 by the host-vehicle 14 if the operator 12 does not begin to brake and bring the host-vehicle to a stop at the intersection 78, and increase the warning-intensity 28 when the time-to-violation 76 is less than a time-threshold, three seconds for example, and the operator 12 is not aware of the object 16 (the traffic-signal 72). It is contemplated that the threshold-time would vary based on the present travel speed of the host-vehicle 14, e.g. greater threshold-times for greater travel speeds. Alternatively, or in combination with increasing the warning-intensity 28, the controller 20 may activate or operate the brake-override device 38 and/or the accelerator-override device 36 to stop the host-vehicle 14 prior to entering the intersection 78 when the operator 12 is not aware of the traffic-signal 72.

Figure 5:
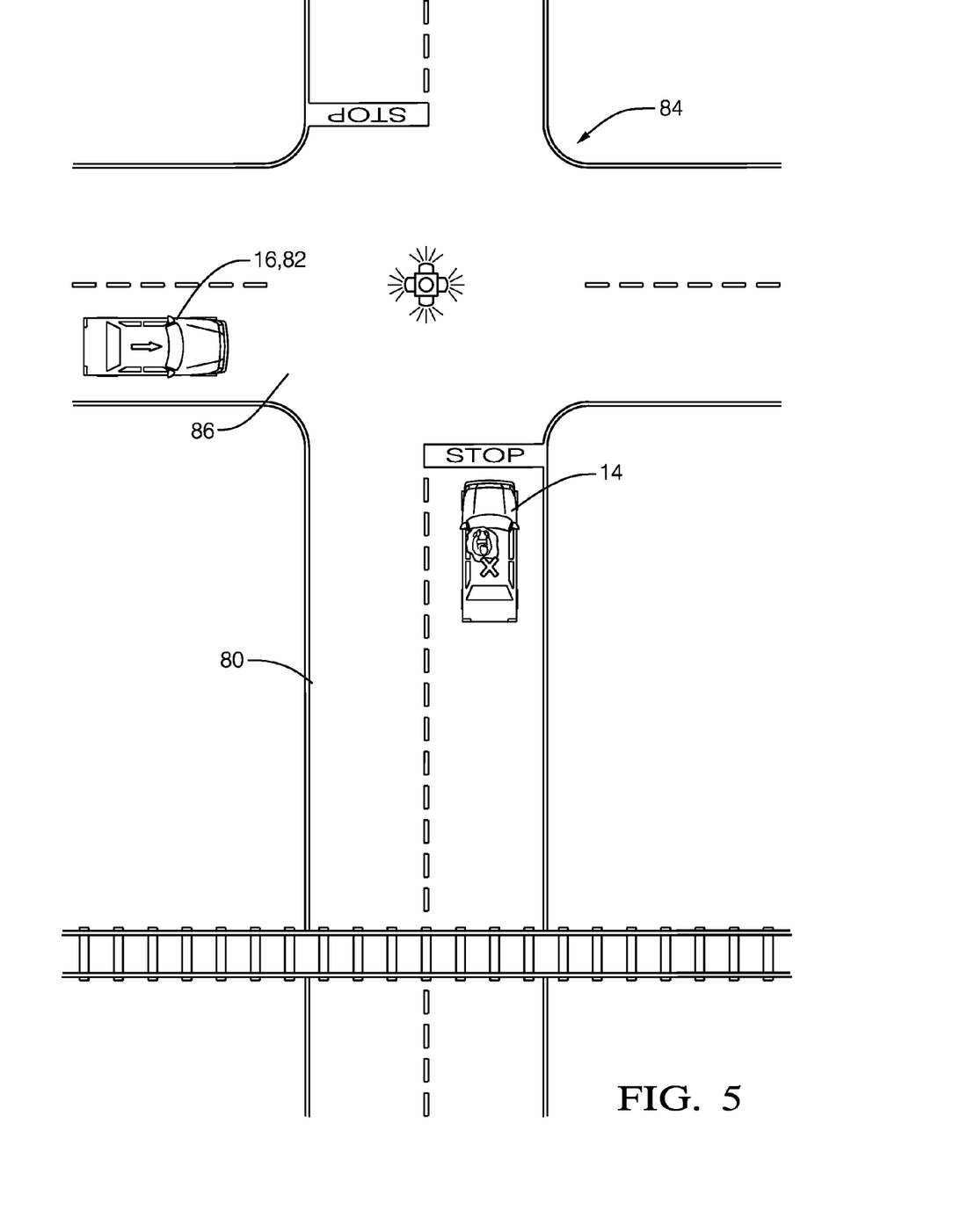
FIG. 5 is an example traffic scenario experienced by the system of FIG. 1 in accordance with one embodiment.

FIG. 5 illustrates another non-limiting example where the host-vehicle 14 is traveling the roadway 80 and the object 16 is an other-vehicle 82 approaching an intersection 84 via a crossing-lane 86 of the intersection 84. In this scenario the host-vehicle 14 is stopped and preparing to enter the intersection 84 to either initiates a turn or straight travel. Traffic on the crossing-lane 86 is not required to stop, so, the time-to-interference 54 (FIG. 1) and/or the time-to-impact 66 should be considered if the host-vehicle 14 proceeds into the intersection 84 before the other-vehicle 82 reaches the intersection 84. Preferable, the control-override device 30 includes an accelerator-override device 36, and the controller 20 may operate the accelerator-override device 36 to prevent the operator 12 from entering the intersection 84 when the operator 12 is not aware of the other-vehicle 82. Alternatively, or in combination with operating the brake-override device 38, the controller 20 may increase the warning-intensity 28, and/or the controller 20 may activate or operate the accelerator-override device 36 to move the host-vehicle 14 away the location shown when the operator 12 is not aware of the other-vehicle 82.

An alternative scenario related to FIG. 5 is when the host-vehicle 14 is stopped as shown and prepared to make a right-turn, and there is a bicycle (not shown) approaching the intersection behind the host-vehicle 14. The system 10 may determine that the bicycle would collide or interfere with the host-vehicle 14 if the right-turn is initiated and increase the warning-intensity 28 before the interference occurs.

Figure 6:
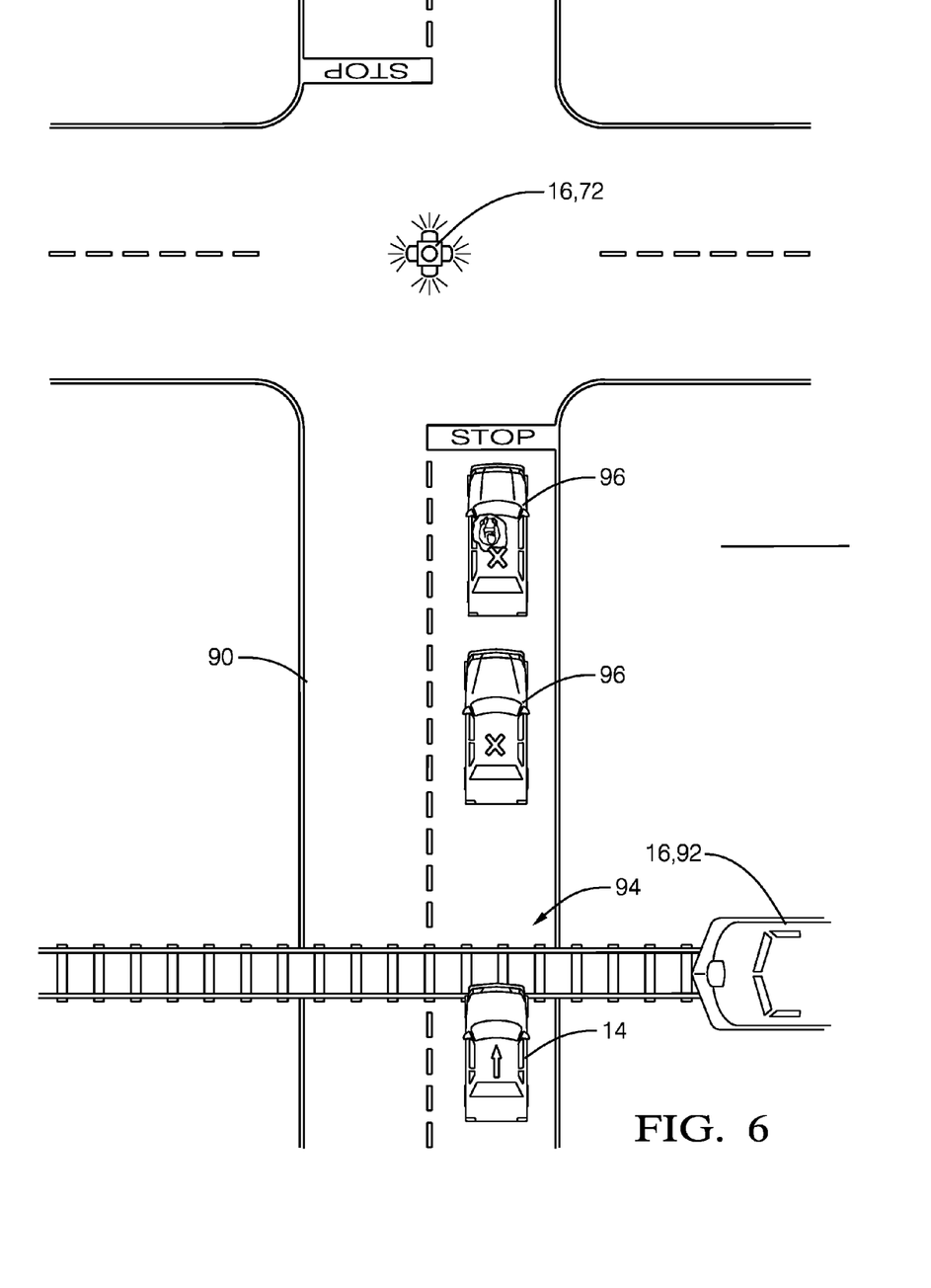
FIG. 6 is an example traffic scenario experienced by the system of FIG. 1 in accordance with one embodiment.

FIG. 6 illustrates another non-limiting example where the host-vehicle 14 is traveling the roadway 90 and the object 16 is a train 92 approaching a rail-road-crossing 94 of the roadway 90. The control-override device 30 advantageously includes the brake-override device 38, and the controller 20 operates the brake-override device 38 to prevent the operator 12 from stopping on the rail-road-crossing 94 when the operator 12 is not aware of the train 92. It is contemplated that the host-vehicle 14 may need to proceed forward and make contact with the stopped-vehicles 96 in order to avoid being hit by the train 92. Alternatively, or in combination with operating the accelerator-override device 36, the controller may increase the warning-intensity 28, and/or the controller 20 may activate or operate the brake-override device 38 to hold the host-vehicle 14 at the location shown when the operator 12 is not aware of the train 92.

Accordingly, a cognitive-driver-assist system (the system 10), a controller 20 for the system 10 is provided. The controller 20 is able to determine the cognitive state of the operator 12, for example determine when the operator is alert and aware of objects arranged about the host-vehicle 14, and when the operator is not alert and not aware of a particular object (the object 16). If the controller 20 determines that some action other than what the operator 12 is doing when the operator is not aware of the object 16, the controller may increase the warning-intensity 28 of a warning provided to the operator 12, and/or take control, either fully or partially, of the host-vehicle 14 and operate the host-vehicle 14 so a collision or interference with the object 16 is avoided.

While this invention has been described in terms of the preferred embodiments thereof, it is not intended to be so limited, but rather only to the extent set forth in the claims that follow.

We claim:

1. A cognitive-driver-assist system, said system comprising:
   an object-detection device operable to detect when an object is proximate to a host-vehicle;
   an operator-detection device operable to determine when an operator of the host-vehicle is aware of the object; and
   a controller configured to output a warning-signal for the operator of the host-vehicle when the object-detection device detects the object, said warning-signal characterized by a warning-intensity that is variable, wherein the controller is configured to increase the warning-intensity when the operator is not aware of the object, wherein the controller is further configured to determine an operator-behavior characteristic of the operator based on a prior-traffic-maneuver executed by the operator, and determine the warning-intensity based on the prior-traffic-maneuver and an interference-risk indicative of the probability of interference between the host-vehicle and the object, wherein the object is an other-vehicle, the operator-behavior characteristic includes a lane-change-interval based on a prior-lane-change executed by the operator, the interference-risk includes an estimate of a time-to-interference for interference between the other-vehicle with the host-vehicle, and the warning-intensity is determined by a comparison of the lane-change-interval to the time-to-interference.

2. The system in accordance with claim 1, wherein the object is an other-vehicle, the operator-behavior characteristic includes a lane-position-variation of the host-vehicle when the host-vehicle is steered by the operator, the interference-risk includes a probability-of-interference between the other-vehicle and the host-vehicle when the other-vehicle is beside the host-vehicle, and the warning-intensity is determined by a comparison of the probability-of-interference to a risk threshold.

3. The system in accordance with claim 1, wherein the object is stationary at a location in a travel-path of the host-vehicle, the controller is further configured to estimate a time-to-impact with the object by the host-vehicle, and increase the warning-intensity when the time-to-impact is less than a time-threshold and the operator is not aware of the object.

4. The system in accordance with claim 1, wherein the object is a pedestrian or animal approaching a travel-path of the host-vehicle, the controller is further configured to estimate a time-to-impact with the pedestrian or animal by the host-vehicle, and increase the warning-intensity when the time-to-impact is less than a time-threshold and the operator is not aware of the pedestrian or animal.

5. The system in accordance with claim 1, wherein the object is a traffic-signal for a travel-path of the host-vehicle, the controller is further configured to estimate a time-to-violation of the traffic-signal by the host-vehicle, and increase the warning-intensity when the time-to-violation is less than a time-threshold and the operator is not aware of the object.

* * * * *